Patented June 13, 1950

2,511,593

UNITED STATES PATENT OFFICE 2,511,593

VINYL CHLORIDE POLYMERIZATION

William J. Lightfoot, Cleveland, Ohio, assignor, by mesne assignments, to United States Rubber Company, New York, N. Y., a corporation of New Jersey No Drawing. Application August 31, 1945, Serial No. 613,962

3 Claims. (Cl. 260—86.3)

The present invention relates generally to the art of polymerization and particularly to a new method of polymerizing vinylidene-group-containing liquid monomeric compounds. More specifically, it deals with polymerization of liquid vinylidene-group-containing monomeric compounds in indifferent media in the complete absence of added emulsifier, suspension stabilizers or dispersing agents and with the polymers obtained thereby.

Heretofore the term "vinyl" has been loosely used in the art to designate not only true vinyl compounds, but also, in some intsances, compounds which are strictly speaking "vinylidene" compounds. The chemical dictionaries give

as the formula for vinyl, and

as the formula for vinylidene. For the purpose of this application, vinyl compounds are considered to be vinylidene compounds in which one of the free bonds has been combined with a hydrogen atom and accordingly the term "vinylidene" as used is meant to include "vinyl."

Vinylidene-group-containing monomers have been polymerized heretofore by various processes commonly referred to as mass, solvent, emulsion, and suspension processes, but none of these processes has been entirely satisfactory, nor has furnished polymerized products which were entirely satisfactory.

In the mass polymerization process, a liquid phase monomer is polymerized without the aid of an added reaction medium. The resulting polymer is a mass article in which the molecular weight is not uniform but varies from part to part thereof. When a catalyst is employed, it is soluble in the monomer, and is not readily removed from the polymers.

In the solvent polymerization process, the monomer is dissolved in a medium capable of forming solutions of high concentrations of the monomer. The solvent is difficult to remove from the polymer, and, almost without exception, is incompletely removed. If a catalyst is used, it is soluble in the solution and is difficult to remove from the polymers.

In the emulsion process, the monomer is dispersed by means of emulsifiers in a medium which is not an efficient solvent for the monomer and a catalyst is used which is soluble in the monomer, or in the medium, or in both the monomer and medium. Coagulating agents are often employed to precipitate the polymers which are formed. The removal of the emulsifying and coagulating agents and catalysts from the polymers is difficult and expensive.

In the suspension process, the monomer which contains a catalyst dissolved therein is added to a water medium and the monomer is dispersed in the medium in the form of small globules which are prevented from recombining or coalescing by the presence of added foreign material, such as talc, bentonite and certain lyophilic colloids. The removal of these foreign materials and the catalyst from the polymers is difficult to accomplish.

It is important that vinylidene-group-containing polymers should be free from foreign materials such as catalysts, solvents, emulsifiers, coagulants and dispersing or coalescence-preventing agents. The presence of catalysts in these polymers tends to cause deterioration or decomposition of the polymers and, due to the difficulty of removing all traces of catalysts, stabilizing compounds have been employed heretofore to inhibit the action of catalysts which remained in the polymers even after extensive and expensive catalyst removing operations. The use of solvents is unsatisfactory because of the cost of the solvents and the cost of removing them from the polymers and because, almost without exception, the solvents can not be completely removed from the polymers. Emulsifiers, coagulants and dispersing or coalescence-preventing materials which remain in the polymers lower the electrical properties of the polymers. The extensive washing which is required to remove these various foreign materials is not only tedious and expensive but also removes some of the plasticizers, where they have been incorporated in the polymers.

These various disadvantages of the prior processes have long been known and many efforts have been made to overcome them but none of those efforts have been entirely satisfactory.

It has also been proposed to polymerize a vinylidene-group-containing monomer by subjecting the gaseous monomer in the absence of liquid monomer to polymerization by contacting the gaseous monomer with a liquid which contains a catalyst in solution. However, whether the gaseous monomer is bubbled through the liquid or is stored above it, the liquid does not dissolve the gaseous monomers rapidly enough to become saturated therewith and there is only a limited amount of gaseous monomer in the liquid at any given time. As a result, only small amounts of the monomer come into contact with the catalyst during any given interval of time and consequently the rate of production of polymers by that proposed method is so slow that the method is uneconomical and non-commercial.

The present invention provides a process which avoids the disadvantages of the prior art processes and provides polymers having properties and characteristics to be preferred and distinguished over the properties of the prior art polymers and also provides a composition of matter, herein referred to as polymer-milk, adapted to facilitate the polymerization of monomers and mixtures of monomers.

It is an object of the present invention to provide an improved, inexpensive, polymerization process that produces a polymer which is of high purity and dielectric strength and is stable with respect to heat and light.

It is a further object of the invention to provide a process according to the preceding object that is suited to the making of a high molecular weight polymer having a plasticizer therein.

It is a further object of the invention to provide a polymer-milk, and method of making the same, which is effective in accelerating the polymerization of various monomers and reducing the cost thereof.

It is a further object of the invention to provide a polymer-milk according to the preceding object that is effective in producing a high molecular weight polymer.

Briefly stated, the method of the present invention includes the steps of bringing a liquid, vinylidene-group-containing monomer into an indifferent liquid median which contains, in solution, a catalyst substantially insoluble in the monomer, the quantity of monomer being greatly in excess of the amount which is soluble in the medium, maintaining a pressure on the mixture of the medium and monomer great enough to keep a portion of the undissolved monomer in liquid form and distributing the liquid monomer throughout the medium in the form of small globules during polymerization. Any well known and suitable plasticizer which is substantially insoluble in the liquid medium may be present during the polymerizing action.

The term "indifferent liquid medium," as used in this specification, includes any liquid which does not dissolve or swell the polymer, does not react chemically with either the monomer or polymer, dissolves the monomer only to a limited extent, and dissolves the catalyst. Water is suitable for use as such a medium, as is also the polymer-milk herein described. The ratio of the indifferent liquid medium to the monomer may range from about 2 to 3 to about 20 to 1.

The present process may be employed to form granular polymers from vinyl chloride, and from mixtures of vinyl chloride with up to about 5% of vinylidene chloride or an alkyl methacrylate, such as isobutyl methacrylate, as shown in Examples III and V below.

Various catalysts may be used with the foregoing monomers but inorganic catalysts, such as persulfates of the alkali metals, including $(NH_4)_2S_2O_8$, have been found to be satisfactory. Sodium peracetate is an example of an organic catalyst which may be used. Such catalysts, when in the presence of the monomers and the indifferent liquid medium, are substantially insoluble in the monomers, that is, not soluble therein to an extent sufficient to affect the finished polymers adversely. The concentrations of the catalyst may range from about 0.1% to about 10% on the basis of the monomer, but the range of 0.5% to 2% is preferable.

The polymerizing temperature may range from about 25° C. to about 100° C. or higher, depending on the particular monomers being polymerized. For vinyl chloride, temperatures between 40° and 55° C. are preferred.

The agitation of the mixture may be accomplished by various means and may vary considerably. With the apparatus described in connection with Examples I, II and III the agitation should not be so violent as to splash the contents of the polymerizer onto its top end but should be sufficiently vigorous to disperse the liquid monomer in the form of small globules more or less uniformly distributed throughout the medium.

The polymers resulting from this process are stable due to the fact that they contain substantially no catalyst and, therefore, no catalyst inhibitor need be added to insure stability. Furthermore, the polymers are substantially free from emulsifying and coagulating agents, solvents and foreign dispersing agents. Because of their high purity these new polymers are particularly suited to electrical applications. These new polymers are granular in form, the size of the granules ranging from about 100-mesh up to ⅛" or larger depending to some extent on the nature and extent of the agitation of the medium during polymerization.

When the plasticizer is added to the reaction medium before polymerization and the polymerization is conducted in the presence of the added plasticizer, a product is obtained which contains in the granules of the polymer substantially all of the plasticizer initially present. Such a granular material containing a plasticizer is capable of being readily milled, extruded or otherwise processed and of having additional quantities of plasticizers easily incorporated therewith. The facility with which such granular polymers take up additional quantities of plasticizer is directly reflected in the use of lower temperatures during the incorporation of plasticizer and thus decomposition due to the high temperatures previously required for this purpose are avoided. Since plasticizers can be incorporated and retained in the polymer during polymerization, it is possible to produce high molecular weight materials which heretofore have been difficult to bring into solution or further to process at temperatures below their decomposition points. It is preferred to maintain the concentration of such plasticizers at relatively low values in the polymerizer, i. e., from about 1% to about 15% by weight on the basis of the monomer.

The new polymers of this invention are easier to handle than those produced by prior polymerization methods. For example, the polymeric reaction product may be easily discharged from the polymerizing vessel since the granules may be washed out of the polymerizer with the reaction medium as they do not adhere to the walls of the polymerizer, as do the products of mass or solvent polymerization processes, and subsequently all the medium may be quickly removed from the granules by decantation or filtration and the latter may be washed with only small amounts of washing liquid since the spaces between the granules permit free flow of liquid therethrough.

While the exact nature and sequence of all the actions effected by the present process is not definitely known, it is believed that the catalyst dissolved in the indifferent medium initiates polymerization of the limited amount of monomer which has been dissolved in and has saturated that medium, with the result that tiny, colloid-like particles of polymer are formed throughout the medium; that as the dissolved monomer is polymerized the medium dissolves corresponding amounts of the liquid monomer and thus continues to remain saturated; and that these actions occur simultaneously or in close sequence and continue all during the polymerization period which may extend for varying lengths of time depending upon the particular monomer, the catalyst employed, and the pressure and temperature conditions maintained during polymerization.

It is also believed that the initially formed, tiny, colloid-like polymer particles are attracted to the liquid monomer globules and eventually are obtained as sizeable granules of pure polymer. Apparently a considerable quantity of tiny, colloid-like particles of polymer is present in the medium at all times after the polymerizing action is initiated for the polymer-milk remaining after the polymerizing operation has been carried as far as is commercially desirable contains considerable quantities of these tiny, colloid-like particles of polymer in suspension. Measurements of the size of these particles from a vinyl chloride polymerization have shown that the most predominant size is about 2600 angstrom units, which is equivalent to 0.26 micron or .0000102".

The polymer-milk herein referred to is a by-product liquor which is obtained by separation of the granular polymer from the reaction medium by decantation or filtration after polymerization and which contains a finely divided colloid-like material and unused catalyst. The polymer-milk resulting from the polymerization of vinyl chloride is white in color, is of approximately the consistency of skimmed cow's milk, and contains a colloid-like material believed to be polyvinyl chloride. The polymer-milk resulting from the polymerization of other monomers may vary in appearance depending upon the particular monomers and/or catalysts employed. In some instances it is a clear, transparent liquid and in other instances it may be colored.

The polymer-milk resulting from one polymerizing operation may be substituted for a corresponding amount of the medium required for a subsequent polymerizing operation and may be so used repeatedly in subsequent polymerizing operations. As obtained from the first polymerization reaction, the polymer-milk has a very pronounced catalytic activity for polymerization reactions, and as a rule may be reused a number of times before its activity is reduced to a point which renders further use impractical. In practice, about 80% of the medium is recovered in the form of "milk" and a percentage of fresh make-up medium containing catalyst is desirable. The polymer-milk from the operation of polymerizing certain monomers may be used as a supplement to the medium used in polymerizing different monomers or may be the sole medium employed. For example, the polymer-milk obtained by polymerizing vinyl chloride monomer by this process may be used as the medium for polymerizing other vinylidene compounds such as methyl methacrylate, styrene, acrylonitrile, etc.

It has also been found that when a glass or glass-lined polymerizer is employed the loss or deterioration of the catalyst is slight and in many instances is not necessary to add any catalyst to the polymer-milk during several subsequent uses.

It is among the advantages of this invention that the catalytic activity of the polymer-milk is greater than can be explained on the basis of the unused catalyst contained therein. For example, when two polymerizations of vinyl chloride are conducted under identical conditions with the exception that in one polymer-milk is used as the medium and in the other distilled water containing catalyst in amount equivalent to that contained in the polymer-milk, the run in which polymer-milk is used polymerized in a shorter time and yielded a polymer of higher molecular weight.

Illustrative, but not limiting, examples of the manner in which the present process may be carried out are as follows:

Example I

The apparatus employed consisted of a stainless steel, pressure polymerizer having cylindrical side walls about 7" high and about 12" in diameter, and hemispherical top and bottom ends. Its capacity was about five gallons. Two, open-type, 6-bladed, turbine impellers about 6" in diameter were positioned in the tank on a vertical shaft, the lower impeller being near the bottom of the cylindrical portion of the polymerizer and the upper one being about two inches below the top of the liquid in the polymerizer. A solution of 0.09 pound of potassium persulfate dissolved in 27 pounds of distilled water whose pH value had been adjusted to about 9 by treatment with sodium hydroxide was charged into the polymerizer. The air in the polymerizer above the surface of the liquid was exhausted, the gas outlet valve was closed, and a small amount of liquid vinyl chloride monomer was introduced into the polymerizer and collected as a gas over the liquid. This gas was evacuated and the operation was repeated to insure substantial absence of air in the polymerizer. With the gas outlet valve finally closed, 9.9 pounds of liquid vinyl chloride monomer were charged into the solution in the polymerizer. Some of this liquid monomer collected as a gas over the water and the pressure within the polymerizer rose to about 85 pounds per square inch, which is the saturated vapor pressure of the vinyl chloride monomer. A small amount of the monomer dissolved in the water while the remainder was retained in liquid form. The temperature of the mixture in the polymerizer was raised to about 50° C. and maintained at that temperature throughout a 15½ hour period during which time the mixture was agitated by the impellers rotating at about 420 R. P. M. At the end of 15½ hours, the unreacted gaseous monomer was removed through the gas outlet from the polymerizer and the liquid containing small granules of vinyl chloride polymer about $\tfrac{3}{32}$" in diameter was discharged from the polymerizer. The granules settled to the bottom of the polymerization mixture and the supernatant liquid or polymer-milk was decanted. The granules were washed with water and dried. The yield of polymer was 4.5 pounds.

Example II

The polymerizer used in this example was the one used in Example I. A mixture of 0.12 pound of potassium persulfate, 0.60 pound of dibutyl phthalate and 36 pounds of distilled water whose pH value had been adjusted to about 9 by treatment with sodium hydroxide was charged into the polymerizer. After evacuation of the polymerizer, as described in Example I, 11.85 pounds of liquid vinyl chloride monomer were charged into the polymerizer with resultant increase of the pressure to about 85 pounds per square inch, and the temperature of the contents of the polymerizer was brought to about 50° C. and maintained at that temperature for 18 hours. During that time the mixture was agitated in the manner specified in Example I. At the end of that time the unreacted gaseous monomer was vented from the polymerizer and the liquid and granules of vinyl chloride polymer about $\frac{1}{16}$" in diameter were withdrawn from the polymerizer. After settling, decantation and drying, 7.6 pounds of dried, partially plasticized, vinyl chloride polymer were obtained.

Example III

The apparatus employed consisted of a stainless steel polymerizer having cylindrical side walls about 12" long and about 12" in diameter and hemispherical top and bottom ends. Its capacity was about seven gallons. About midway in the vertical section there were two sight glasses for observation. Two, open-top, 6-bladed, turbine impellers about 6" in diameter were located in the polymerizer. One was near the bottom of the cylindrical portion and the other about 2" below the liquid level. A solution consisting of 39 pounds of distilled water, treated with sodium hydroxide to bring the pH value to about 9, and 0.28 pound of potassium persulfate was charged into the polymerizer and filled the latter up to about 1" on the sight glasses. After evacuation of the polymerizer, as described in Example I, 0.53 pound of liquid vinylidene chloride monomer and 13.1 pounds of liquid vinyl chloride monomer were charged into the polymerizer and the pressure rose to about 85 pounds per square inch. The temperature of the mixture in the polymerizer was raised to about 50° C. and maintained at that temperature throughout a 12 hour period, during which time the contents of the polymerizer were agitated by the impellers rotating at about 420 R. P. M. At the end of 12 hours, the unreacted gaseous monomers were vented from the polymerizer and the liquid containing small granules of vinyl chloride-vinylidene chloride mixed polymerization product was discharged from the polymerizer. The granules were separated from the polymer-milk by decantation. The granules, after being washed with water and dried, weighed 7.25 pounds.

Example IV

The apparatus employed consisted of a glass pressure vessel of about one liter capacity. A solution of 300 grams of distilled water and 1.0 gram potassium persulfate was placed in the chilled vessel. Then 99.8 gms. of cold liquid vinyl chloride monomer and 0.5 gm. of cold liquid diallyl succinate monomer were added. The vessel was closed and brought to room temperature, agitated by an end-over-end motion for 80 hours while being kept at a temperature of about 24° C. The vessel was then opened and polymer-milk and white granules were discharged. This granular product, after separation, washing and drying, was insoluble in most commercial solvents but it was capable of being molded with a plasticizer into a continuous sheet.

Example V

The apparatus used in this example was the one used in Example IV. A solution of 1 gm. of potassium persulfate dissolved in 300 gms. of distilled water was placed in the chilled vessel, and 94.7 gms. of cold liquid vinyl chloride and 5 gms. of cold, liquid isobutyl methacrylate were added. The mixture was agitated as described in Example IV for 22 hours while being held at approximately 55° C. Then the vessel was opened and the polymer-milk and granular material were discharged. The yield of granular material was 95% on the basis of monomers charged into the vessel. This material was fusible at a low temperature.

Example VI

The apparatus used in this experiment was the one used in Example IV. The charge consisted of a solution of 1 gram of potassium persulfate dissolved in 300 grams of distilled water and 100 grams of vinyl chloride monomer. The mixture was agitated as described in Example IV at a temperature of 55° C. for six hours. The yield of polyvinyl chloride after separation from the polymer-milk, washing and drying was 40% of the theoretical.

Example VII

The apparatus used in this experiment was the one used in Example IV. The charge consisted of a mixture of 260 grams of the polymer-milk from the vinyl chloride polymerization of Example VI, 40 grams of water and 100 grams of vinyl chloride monomer. No catalyst other than that contained in the polymer-milk was employed. The mixture was agitated as described in Example IV at a temperature of 55° C. for six hours. The yield of polyvinyl chloride after separation, washing and drying was 70% of the theoretical. The larger yield as compared with Example VI was appreciable and demonstrates the increased catalytic effect of the polymer-milk on rate of polymerization. The molecular weight of the polymer of this example as determined by viscosity determinations was 25% higher than that of the product obtained in Example VI.

Example VIII

The apparatus and method of operation used in this polymerization were substantially the same as employed in Example III. The charge consisted of 32 pounds of polymer-milk from a vinyl chloride polymerization such as obtained in Example I and 12.8 pounds of fresh vinyl chloride monomer. The reaction was carried out at 45° C. The pressure rose to 85 pounds per sq. in. and remained essentially constant throughout the reaction. At the end of seventeen hours a marked pressure drop was noted but the reaction was continued for an additional hour. The gaseous unreacted monomer was vented to the atmosphere and the liquid containing the polymer discharged from the reactor. The product was collected on a filter, washed with water and dried. It was obtained in the form of chalk white granules and weighed 6.6 pounds.

Having thus described the invention so that others skilled in the art may be able to understand and practice the same, I state that what I desire to secure by Letters Patent is defined in what is claimed.

What is claimed is:

1. The method of producing a granular vinyl chloride polymer which comprises bringing together liquefied monomeric material selected from the group consisting of vinyl chloride and mixtures of vinyl chloride with up to about 5% of material of the group consisting of vinylidene chloride and alkyl methacrylate, and an indifferent liquid medium consisting essentially of water and water-soluble catalyst of the group consisting of alkali-metal persulfates, ammonium persulfate and sodium peracetate, mechanically agitating such mixture to distribute the liquid monomeric material throughout the aqueous medium in the form of small globules and to maintain said globules thus distributed throughout the aqueous medium during polymerization, maintaining such mixture in the temperature range from 25° C. to 100° C., and maintaining the pressure on such mixture at substantially the saturated vapor pressure of said monomeric material at said polymerization temperature, until at least 40% of the polymerizable monomers have been polymerized in the form of granules which when not agitated settle to the bottom of the polymerization mixture.

2. The method of producing granular polyvinyl chloride which comprises bringing together liquefied vinyl chloride and an indifferent liquid medium consisting essentially of water and alkali-metal persulfate, mechanically agitating such mixture to distribute the liquid vinyl chloride throughout the aqueous medium in the form of small globules and to maintain said globules thus distributed throughout the aqueous medium during polymerization, maintaining such mixture in the temperature range between 40° C. and 55° C., and maintaining the pressure on such mixture at substantially the saturated vapor pressure of the vinyl chloride at said polymerization temperature, until at least 40% of the polymerizable monomers have been polymerized in the form of granules which when not agitated settle to the bottom of the polymerization mixture.

3. The method of producing granular polyvinyl chloride which comprises the steps of bringing into a closed reaction vessel liquefied vinyl chloride and an indifferent liquid medium consisting essentially of water and potassium persulfate, distributing the liquid vinyl chloride throughout the aqueous medium in the form of small globules and maintaining said globules distributed throughout the aqueous medium during polymerization by mechanical agitation of the contents of the reaction vessel, maintaining the polymerizing temperature in the range between 40° C. and 55° C., and maintaining the pressure in the reaction vessel at substantially the saturated vapor pressure of the vinyl chloride, until at least 40% of the polymerizable monomers have been polymerized in the form of granules which when not agitated settle to the bottom of the polymerization mixture.

WILLIAM J. LIGHTFOOT.

REFERENCES CITED

The following references are of record in the file of this patent:

UNITED STATES PATENTS

| Number | Name | Date |
| --- | --- | --- |
| 2,068,424 | Mark et al. | Jan. 19, 1937 |
| 2,147,154 | Fikentscher et al. | Feb. 14, 1939 |
| 2,179,040 | Heuer | Nov. 7, 1939 |
| 2,259,180 | Schoenfeld et al. | Oct. 14, 1941 |
| 2,277,504 | Wiley | Mar. 24, 1942 |
| 2,286,264 | Crawford et al. | June 16, 1942 |
| 2,296,403 | Renfrew et al. | Sept. 22, 1942 |
| 2,373,347 | Schoenfeld | Apr. 10, 1945 |
| 2,397,260 | Hanford | Mar. 26, 1946 |
| 2,419,008 | Coffman et al. | Apr. 15, 1947 |
| 2,422,392 | Brubaker et al. | June 17, 1947 |